(No Model.)
A. V. RYDER.
CULTIVATOR TOOTH.
No. 512,625. Patented Jan. 9, 1894.
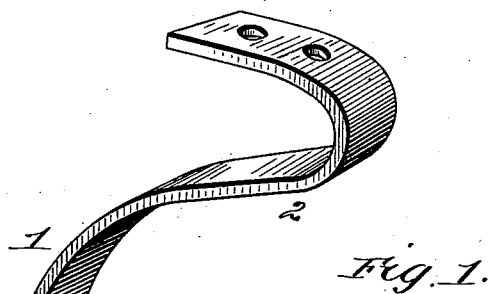
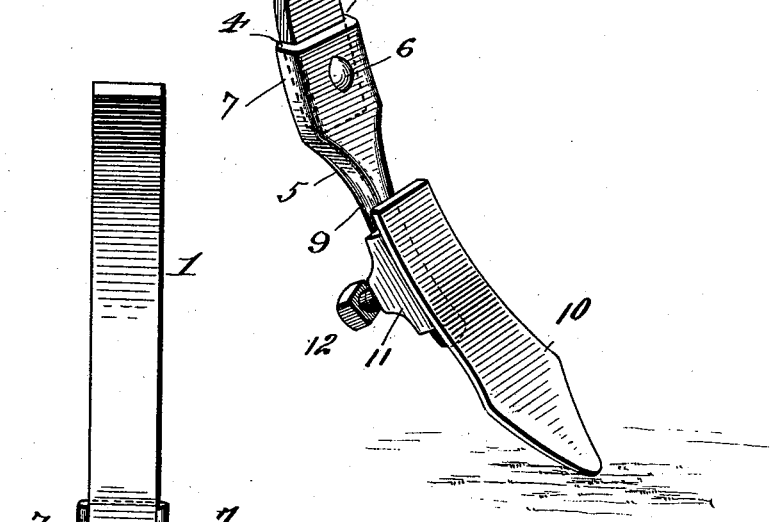
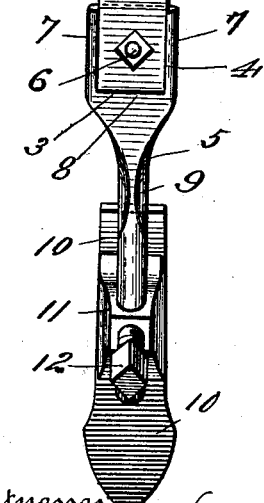
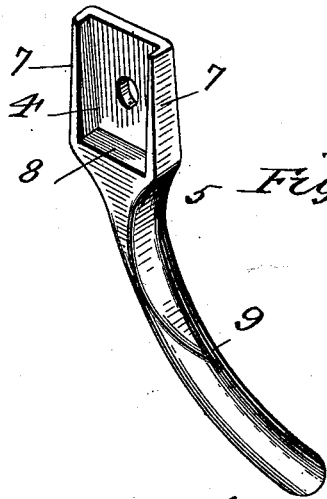
Witnesses
E. J. Cussen
G. M. Copenhaver.
Inventor
A. V. Ryder
By his Attorneys
Alexander & Davis

UNITED STATES PATENT OFFICE.

ANDREW V. RYDER, OF BELLEVUE, OHIO.

CULTIVATOR-TOOTH.

SPECIFICATION forming part of Letters Patent No. 512,625, dated January 9, 1894.

Application filed May 2, 1892. Serial No. 431,441. (No model.)

*To all whom it may concern:*

Be it known that I, ANDREW V. RYDER, a citizen of the United States, residing at Bellevue, in the county of Huron and State of Ohio, have invented certain new and useful Improvements in Cultivator-Teeth, of which the following is a specification, reference being had therein to the accompanying drawings.

This invention relates to a new and useful improvement in spring cultivator-teeth; and it has for its object to provide a spring tooth which may be easily and cheaply manufactured.

Another object of this invention is to provide a tooth the blade of which may be adjusted rotatively or raised or lowered to meet the varied requirements of plant cultivation.

The invention consists in the novel combination and arrangement of parts more fully hereinafter described and particularly pointed out in the claims appended.

In the drawings: Figure 1 is a perspective view of my improved tooth. Fig. 2 is a rear elevation; and Fig. 3 is a detail view of the extension of the spring shank.

The numeral 1, in the drawings designates the curved flat spring shank of my improved tooth. This spring shank is curved from a point 2, rearwardly and downwardly toward its lower end, and upwardly and rearwardly from the same point toward its upper end, as shown clearly in Fig. 1. The object in thus curving this shank is that it facilitates attachment of the tooth to the cultivator beam, and also gives additional resiliency to the shank. The lower end of the spring shank 1, is squared as shown at 3, and fits a socket 4 formed in the rear side, at the upper end of the extension 5 of the tooth, and it is secure therein by a bolt or rivet 6. The socket 4 is formed on the extension 5, by the rearwardly extending flanges 7—7 which embrace the side edges of the shank 1, and the shoulder 8 against which the squared lower end of the shank abuts. The extension 5, below the socket 4, is formed into a round bar or rigid shank 9, which is curved downwardly and forwardly as shown, and has adjustably secured thereon the blade 10. This section or extension 5 may be swaged by suitable dies, or it may be cast in the desired shape. The rigid shank 9, passes through the rearwardly extending lug 11 of the shovel, and a set screw 12, is tapped through the lug as shown, and secures the shovel adjustably on said shank. By this arrangement the shovel may be adjusted rotatively on the shank 9 in order to throw the dirt on either side, and it may also be raised or lowered thereon, as is evident.

From the foregoing the advantages of my invention will be readily understood. It will be seen that I produce an exceedingly cheap and strong spring-tooth by the use of a short spring shank which may be inexpensively manufactured, and an extension piece which may be cast or otherwise cheaply formed, and, as is evident, when the tooth becomes broken or worn the useless section may be renewed without the necessity of renewing the whole tooth.

Having thus fully described my invention, what I claim, and desire to secure by Letters Patent, is—

1. A spring cultivator tooth consisting of a curved spring shank, an extension having a socket at its upper end in which is secured the lower end of the spring shank, said extension having at its lower part a rounded and downwardly and forwardly curved shank, and a cultivator blade or shovel adjustably secured on said rounded shank, substantially as described.

2. A spring cultivator tooth consisting of a curved spring shank, an extension detachably secured to the lower end of said shank, said extension at its upper end fitting over the lower end of the spring shank and having the rearwardly extending flanges 7, 7, which embrace the side edges of the spring shank, and the shoulder 8 against which the lower end of the spring shank abuts, the lower end of the said extension being formed into a rounded shank, curved as shown, and a shovel adjustably secured on said rounded shank substantially as described.

In testimony whereof I affix my signature in presence of two witnesses.

ANDREW V. RYDER.

Witnesses:
S. B. KLECKNER,
C. S. SCHREMER.